No. 888,000. PATENTED MAY 19, 1908.
J. W. CONNER.
COTTON SEED GRADING MACHINE.
APPLICATION FILED MAY 27, 1907.
3 SHEETS—SHEET 2.
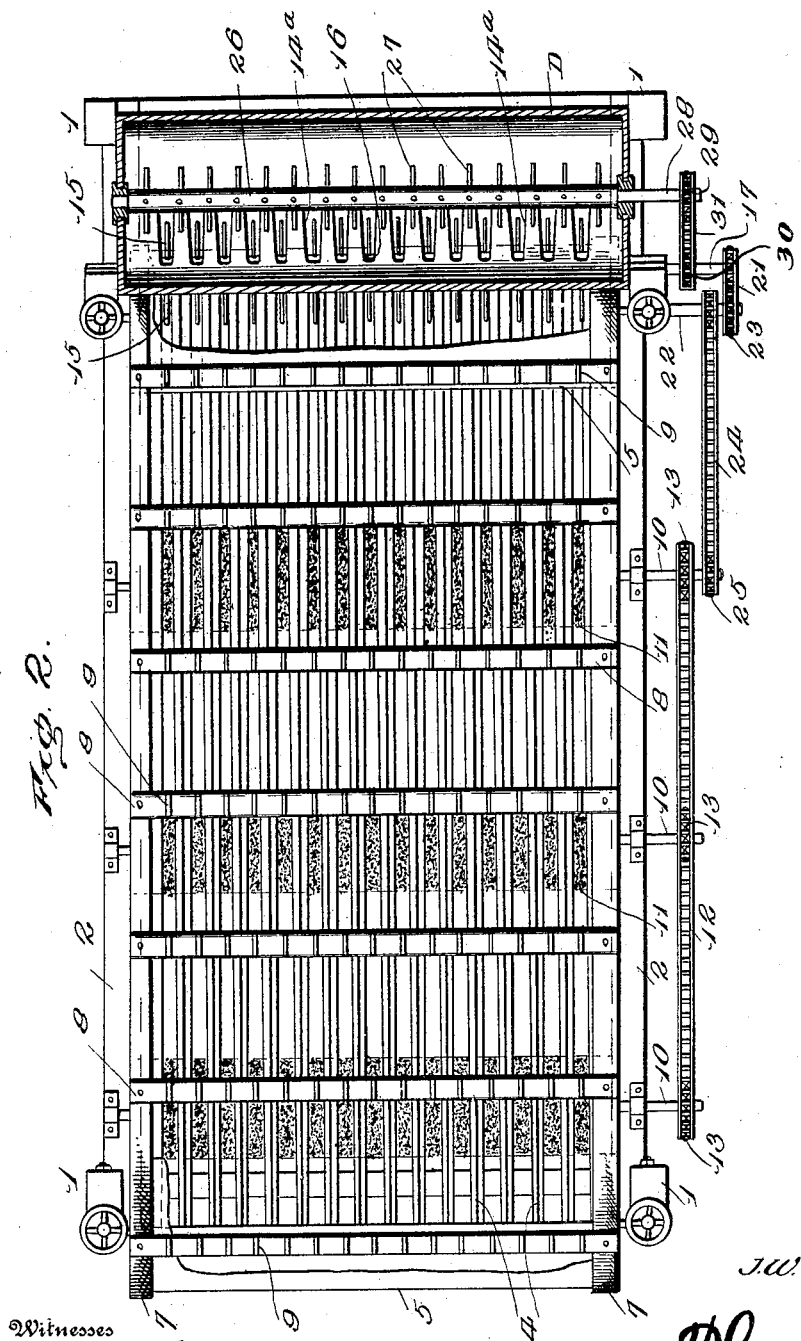
Inventor
J. W. Conner
Witnesses
By R. H. A. B. Lacey,
Attorneys

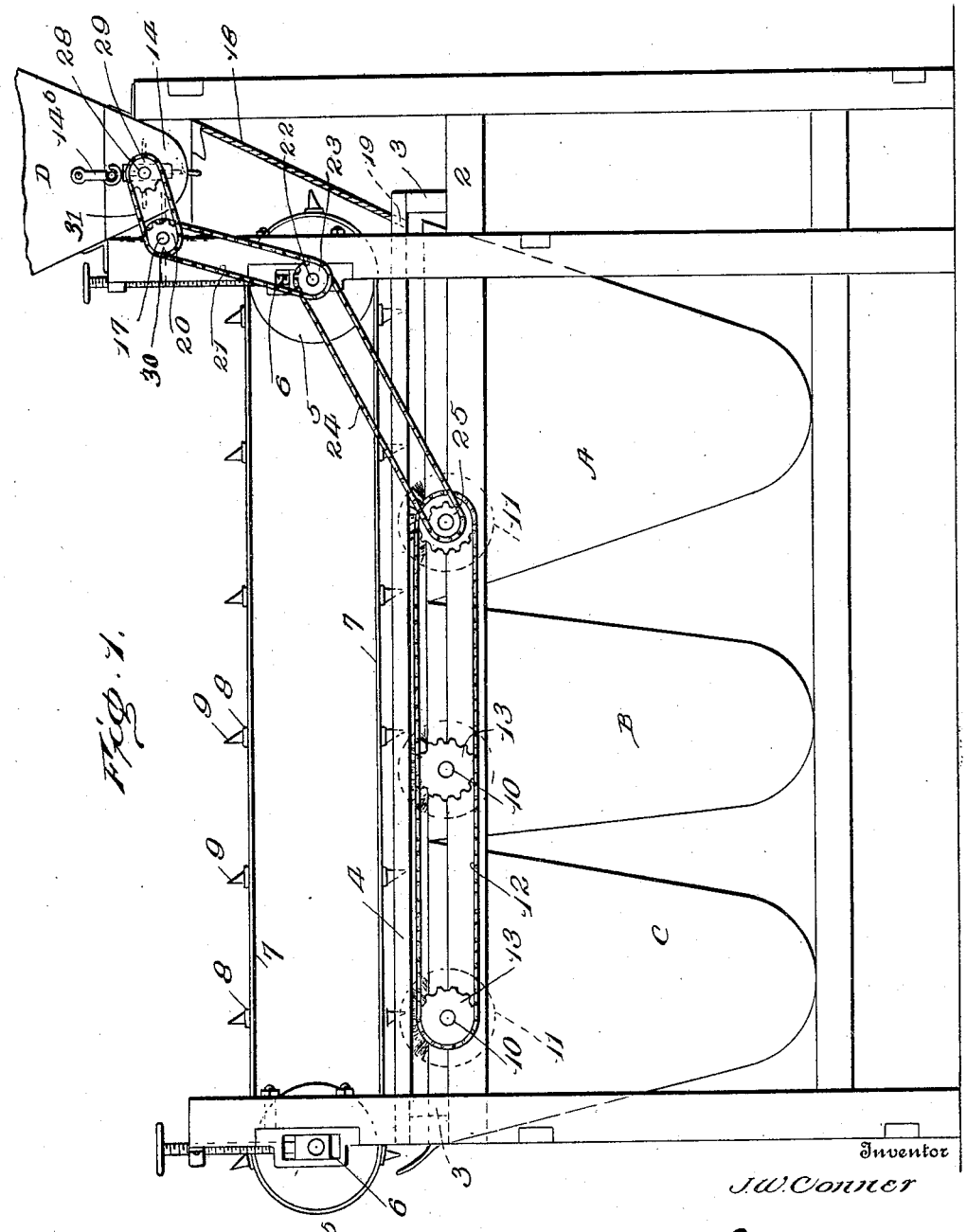

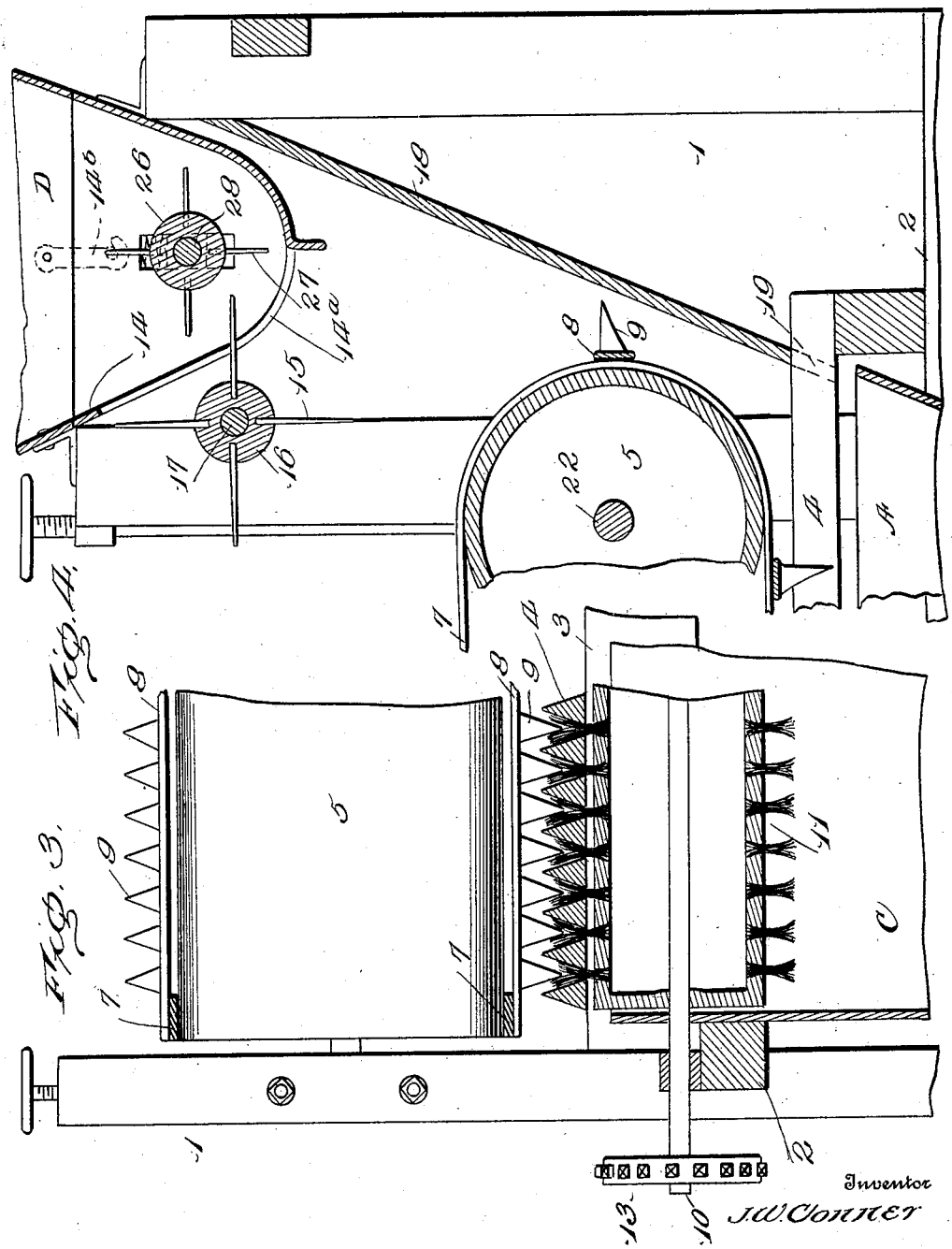

UNITED STATES PATENT OFFICE.

JOHN W. CONNER, OF ALBANY, TEXAS.

COTTON-SEED-GRADING MACHINE.

No. 888,000.　　　　　Specification of Letters Patent.　　　　　Patented May 19, 1908.

Application filed May 27, 1907. Serial No. 375,990.

*To all whom it may concern:*

Be it known that I, JOHN W. CONNER, citizen of the United States, residing at Albany, in the county of Shackelford and State of Texas, have invented certain new and useful Improvements in Cotton-Seed-Grading Machines, of which the following is a specification.

This invention has for its object a simple, durable, and efficient construction of machine for grading cotton seed, and the invention consists in certain constructions, arrangements and combinations of the parts that I shall hereinafter fully describe and then point out the novel features in the appended claims.

For a full understanding of the invention and the merits thereof and also to acquire a knowledge of the details of construction of the means for effecting the result, reference is to be had to the following description and accompanying drawings, in which:

Figure 1 is a side elevation of my improved cotton seed grading machine; Fig. 2 is a top plan view thereof, the hopper being removed; Fig. 3 is a transverse sectional view of one side of the machine on an enlarged scale; and, Fig. 4 is a longitudinal sectional view of the machine at the hopper end thereof.

Corresponding and like parts are referred to in the following description and indicated in all the views of the drawings by the same reference characters.

The frame work of my cotton seed grader may be of any desired size or construction, and in the present instance I have shown it as embodying six upright posts 1 connected together by suitable cross beams and by longitudinal sills, one pair of sills, designated 2, projecting inwardly so as to form tracks or supports for a grading tray. This tray comprises a framework 3, the side bars of which are adapted to rest removably upon the inwardly projecting ledges of the sills 2, the said tray being designed for removal by sliding out from one end or the other of the framework in an evident manner. The framework 3 of the tray supports a series of longitudinally extending bars 4 that are secured at their ends to the end bars of the frame and that are preferably inverted V-shape in cross section, as shown. These bars 4 are spaced from each other and are slightly tapered from their front towards their rear ends so as to provide rearwardly diverging slots or spaces between them for the seed to pass through. In order to carry the seed along these bars 4, I provide a conveyer which, in the present instance comprises front and rear transversely extending rollers 5 that are journaled between opposite pairs of posts 1 by means of vertically adjustable journal boxes 6, said boxes being fastened on the posts of the framework by bolts working in vertical slots, so that they may be raised or lowered as required for adjusting the belts which they carry.

In addition to the rollers 5, the conveyer comprises belts 7 that extend around or over the rollers, as shown, and that are connected together at any desired intervals by transversely extending slats 8, each of which is provided with a series of V-shaped teeth 9. These teeth are adapted to pass into the spaces between the inverted V-shaped grading bars 4 and drag the cotton seed along between the bars towards the rear of the machine. It is to be particularly noted that the teeth 9 extend slightly rearwardly on the lower lap of the conveyer so that they will drag the cotton seed rearwardly by their action, and at the same time tend to press it downwardly so that the seed of different sizes will drop through the rearwardly diverging or widening spaces between the bars as soon as the space is wide enough to permit them to pass through. As the seeds of the different grades drop through the spaces between the bars, the different grades will be received in chutes or receptacles, of which, in the present instance, I have shown three, designated A, B and C. These chutes are trough shaped as shown and are placed underneath the grading tray. They are adjustable and may be removed from one point to another as may be necessary for the separation of the seed into such grades as may be desired.

Journaled at their ends in the longitudinal sills 2 are shafts 10, one for each of the receiving troughs or chutes, A, B and C, and located at one side of the respective troughs or chutes. These shafts 10 carry cylindrical brushes 11 which work underneath the grading tray. The purpose of these brushes is to catch the seeds when they pass through the spaces between the bars 4 and they are useful because the seeds have so much lint on them that they tend to adhere to each other and also to other substances. The brushes are arranged so as to slightly touch the bottom of the bars 4, thus catching the seeds when they pass through the spaces between the bars. The seeds falling from the hopper drop on the front ends of the bars at the most narrow point of the gradually widening spaces or slots between the bars and as they pass back, the small seed are filtered out so that only the larger seeds are carried to the back end of the tray, and as the seeds are passed through they are brushed off the bars A, B and C so that each grade is kept separate from the others.

Any means may be provided for revolving the brushes 11. In the present instance, for the purposes of illustrating an operative structure, I have shown these brushes as being operatively connected together by means of a sprocket chain 12 and sprocket wheels 13 mounted on the respective shafts 10.

The hopper D is mounted at one upper end of the framework, as shown, and a bottom portion 14 of the hopper is of somewhat oblong shape, as shown, forming a dispenser. This dispenser is preferably made of sheet iron with slots 14$^a$ cut therein in one side, reaching from the bottom of the circular trough constituted by the part 14 up a predetermined distance on the rear or left hand side thereof, next to the grading tray. The slots 14$^a$ are cut just wide enough at the top for the teeth 15 to pass therethrough, said teeth extending radially from the cylinder 16 journaled on the shaft 17 at the rear end of the hopper above the grading tray, said shaft being journaled in the upper ends of the opposite posts 1. The slots 14$^a$, where the ends of the teeth 15 pass out in the revolution of the cylinder 16 are made wide enough for a cotton seed to pass therethrough and the slots are spaced from each other a distance corresponding to the distance between the teeth 15 of the several rows on the distributing cylinder 16. The slots 14$^a$ constitute escapements and for this purpose the wider ends of the slots where the seeds pass through are cut so that the edges will turn downwardly to form a trough large enough to admit of one large seed or several small ones, so that the teeth of the distributing cylinder 16 will catch them and press them through, where they will fall upon the inclined apron 18 which extends from the lower rear side of the trough or hopper down to the front end of the grading tray and which is provided at its lower edge with a series of V-shaped fingers 19 adapted to extend into engagement with the bars of the said tray. The shaft 17 may be driven by means of a pulley or a sprocket wheel 20 and a belt or sprocket chain 21 engaging with another belt wheel or sprocket wheel 22 on the shaft of the adjacent roller 5 of the endless conveyer, and said shaft in turn may be provided with a sprocket wheel 23 which is operatively connected by a chain 24 and sprocket 25 with one of the shafts 10 for the series of cylinder rotary brushes 11.

In addition to the distributing cylinder 16, I preferably provide a feeding cylinder 26 mounted within the hopper D and provided with a plurality of teeth 27. These teeth 27 are adapted to stir or manipulate the seeds inside of the trough-like dispenser at the bottom of the hopper D, and the teeth 27 of the feeder are set in staggered relation to each other. That is, they alternate on each side of a line on the cylinder that will correspond with the slots 14$^a$ in the dispenser. Thus they pass alternately along the sides of the slots and brush the seeds into the escapement or drop portions of the slots in the bottom of the dispenser 14, clearing and passing alongside of the teeth of the distributing cylinder 16 as the said teeth pass into and out of the upper side of the dispenser 14. The feed cylinder 26 is mounted on the shaft 28 which may be journaled at its ends in the lower portion of the hopper D and which may be operatively connected to the shaft 17 in any desired manner, as by the sprocket wheels 29 and 30 and sprocket chain 31.

While I have shown a sprocket gear for driving the different revoluble and traveling elements of the machine and while I have shown it for the purposes of illustration only, as mounted all on one side of the machine, it is to be understood that the different parts may be driven in any desired way other than that shown and that the driving connections may be so arranged on both sides of the machine so as to equalize the draft. The entire machine may be driven in any desired way, and it is to be understood that the machine may be made in various sizes, according to the work which is required of it, or the particular location in which it is to be installed. For instance, the grading machine of my invention may be incorporated with a gin and may be run by the same power as the other machinery. Or, it may be made of medium size, suitable for small gasolene engines or other prime movers, or still in smaller sizes for general use on the farm and supplied with a crank so as to be operated by hand. It is also to be understood that changes may be made in the details of construction and arrangements of the parts herein-described and shown, without departing from the scope of the invention as defined by the appended claims.

The dispenser 14 may, as best seen in Figs. 1 and 4, form a separate attachment to the trough or hopper D, being detachably secured thereto by means of swinging hooks 14$^b$ depending from the main portion of the hopper and engaging studs on the ends of the dispenser 14. Preferably the shaft 28 of the cylinder 26 is mounted in spring bearings, as shown, so that it may be adjusted whenever desired to vary the tension.

Having thus described the invention, what is claimed as new is:

1. A cotton seed grading machine, comprising a framework, a grading tray mounted in said framework and embodying a series of longitudinally extending inverted V-shaped bars spaced from each other, the said spaces widening rearwardly, means for depositing the cotton seed upon one end of said tray, an endless conveyer mounted in the framework with both laps above the tray and embodying a series of transversely extending slats provided with V-shaped teeth extending on the lower lap of the conveyer down into the V-shaped spaces between the bars so as to drag the material rearwardly and downwardly into and through said spaces, and means for actuating said conveyer.

2. A machine of the character described, comprising a framework, a grading tray mounted in said framework, a hopper mounted in the framework above one end of the grading tray, the bottom of the hopper being provided with a plurality of slots, a distributing cylinder journaled in the framework at the rear of the hopper and provided with teeth extending into the hopper through the slots, a feeding cylinder mounted within the hopper and provided with teeth alternating on opposite sides of said slots and also alternating with the teeth of the distributing cylinder, and means for driving said cylinders.

In testimony whereof I affix my signature in presence of two witnesses.

JOHN W. CONNER. [L. S.]

Witnesses:
   A. W. REYNOLDS,
   G. C. KING.